(No Model.)
J. F. MAXSON.
REGULATING VALVE FOR NATURAL GAS.
No. 324,571. Patented Aug. 18, 1885.
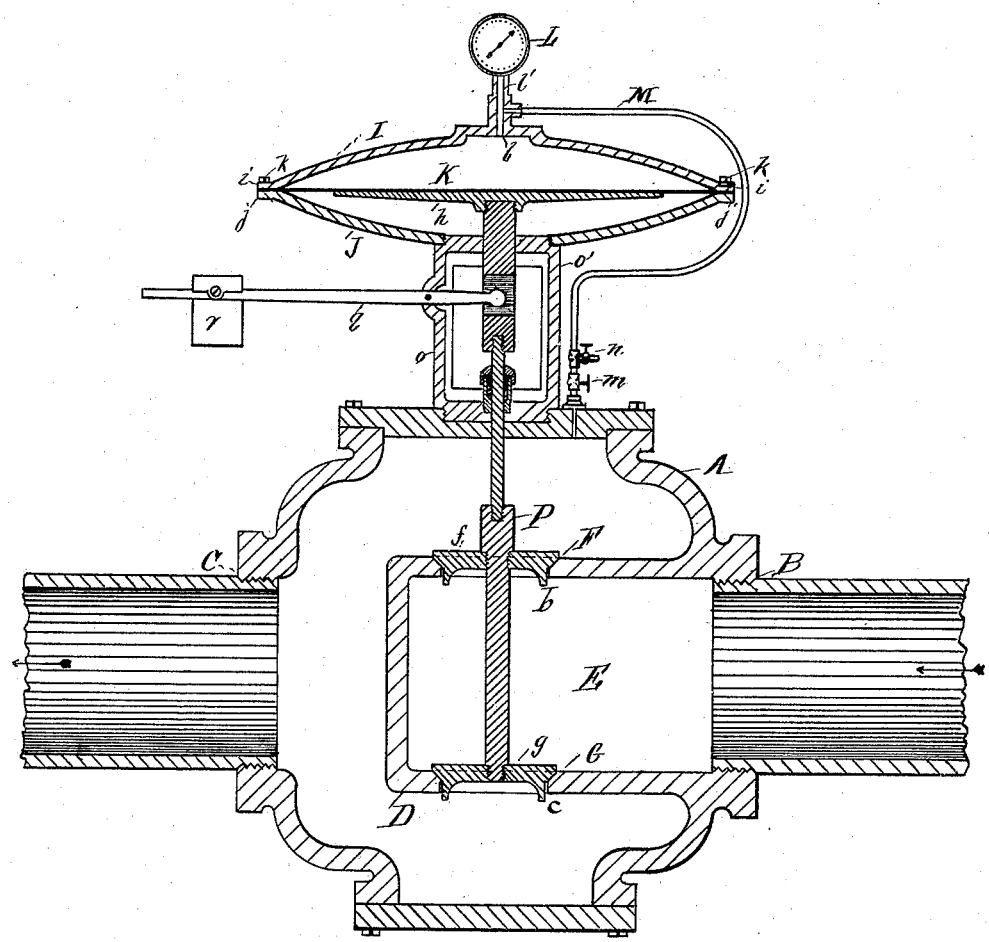

UNITED STATES PATENT OFFICE.

JOHN F. MAXSON, OF GENESEE, NEW YORK.

REGULATING-VALVE FOR NATURAL GAS.

SPECIFICATION forming part of Letters Patent No. 324,571, dated August 18, 1885.

Application filed February 12, 1885. (No model.)

*To all whom it may concern:*

Be it known that I, JOHN F. MAXSON, of Genesee, in the county of Allegany and State of New York, have invented certain new and useful Improvements in Regulating-Valves for Natural Gas; and I do hereby declare that the following is a full, clear, and exact description of the invention, which will enable others skilled in the art to which it appertains to make and use the same, reference being had to the accompanying drawings, which form a part of this specification, in which the figure is a vertical sectional view of the regulating-valve.

This invention has relation to valves for regulating the flow of gas, and is particularly adapted for regulating the flow of natural gas. As is well known, the natural gas, as it flows from the well, is at a pressure too great for the ordinary uses to which it is put. It is therefore desirable that means should be provided for regulating and limiting the pressure at which the gas is delivered to the consumer. This regulator must be of such a construction that it will be automatic in its action, accommodating itself to the amount of pressure in the mains or at the well, so that no matter what the variation may be in the mains it will be constant in the supply-pipe.

I am aware of the fact that regulating-valves for the same purpose as mine have been heretofore devised and used; but the main feature of that class of valves is that the regulating devices are controlled by the main or high pressure, which, being very great, requires the use of very heavy weights to overcome it.

My invention consists in the provision of means whereby the regulation of the pressure is accomplished by the pressure in the supply or low-pressure pipes. By these means I am enabled to overcome the pressure, and on account of the small power used I am enabled to make all parts of the regulating device both smaller and lighter than the ordinary forms of valves now in use, thereby materially reducing the cost of the valves. It is well known that natural gas is very much lighter than air, and that it is of such a peculiar character that it will not mix or mingle with the air, invariably rising above the air with which it is brought in contact. In the construction of my valve I have taken advantage of this peculiar property of the natural gas to provide a means whereby the gas will not come in contact with such portions of the device as would be likely to be damaged or destroyed by the gas.

Referring to the accompanying drawings, A designates the spherical body of the valve having inlet and outlet ports B C. Cast integral with this body A is a partition, D, of such a shape as to form a bowl-shaped chamber, E, having its mouth at B. This cup or bowl E has two openings, F G, communicating with the interior of the body A, and serving as seats for the valves $f$ $g$. The valves $f$ $g$ are held together by rod P, passing through valve $f$, and securely keyed to valve $g$.

Above the body A is the diaphragm chamber or case H, consisting of the two dish-shaped halves I J, which are formed with annular flanges $i$ $j$, through which bolts or rivets $k$ $k$, &c., are fastened, thus holding the two halves together.

The diaphragm K consists of a disk of rubber, and it is retained in position by having its edges clamped between the two halves of the chamber or between the flanges $i$ $j$.

The upper half, I, of the diaphragm chamber H has an opening, $l$, in the center, to which is attached the short pipe $l'$, having pressure-gage L at the upper end. To one side of this pipe, and opening therein, is pipe M, leading from the top of the chamber A. This pipe M is supplied with stop-cock $m$, the purpose of which will be more fully described hereinafter. In the pipe M, above stop-cock $m$, is also placed a blow-off valve, $n$.

The diaphragm-chamber is supported in position and attached to the chamber A by frame or lugs $o$ $o'$. The rod P, which connects the pistons $f$ $g$, passes through the upper part of the chamber A, being suitably packed to prevent the escape of gas around it, and enters the lower half of the diaphragm-chamber, and to the top of the rod P is attached a metal disk, $h$, which presses against and supports the center of the diaphragm.

To one of the supports $o$ is pivoted an arm or lever, $q$, carrying a sliding weight, $r$, on its outer end, and connected to the rod P by a socket-joint, or in any other suitable manner.

It will be seen that the weight $r$ and the lever $q$ raise the rod P and valves $f\ g$, thus opening a passage between the ports B C. The extent to which the valves $f\ g$ are raised can be regulated, by means of the weight $q$, to allow any desired quantity of gas to pass from B to C, and also to regulate the pressure at which the gas shall flow.

The operation of the valve is as follows: The weight $r$ having been placed at such a position on the lever $q$ that the valves $f\ g$ are raised, a certain predetermined amount of gas is allowed to flow through the valve, and the stop-cock $m$ being opened gas flows through pipe M and fills the upper half of the diaphragm-chamber H, the air contained therein being forced against the diaphragm and preventing the gas from coming in direct contact therewith. If through any cause the pressure of the gas increases in the chamber A, it is transmitted through pipe M to diaphragm, which is thereby forced down and closes the valves $f\ g$ and holds them in that position till the pressure in the chamber A is reduced to the desired state.

The object of making the diaphragm of rubber is that it is more susceptible to changes of pressure than if it were made of metal, and as the gas does not come in contact with it there is not the same liability of its being destroyed by the chemical action of the gas.

If at any time it is desirable to replace the diaphragm, it can be easily done without cutting off the gas by removing the top piece of the diaphragm-chamber and inserting the new diaphragm, the cock $m$ having been previously closed to prevent the escape of gas from chamber A, and the blow-off valve $n$ opened to allow the escape of gas from the diaphragm-chamber.

Having described my invention I claim—

In a device for regulating the flow of gas, comprising a high and low pressure chamber and an interposed regulating-valve actuated by a diaphragm in an independent chamber, a communicating conduit from the low-pressure chamber to the upper part of the diaphragm-chamber, said conduit having a stop-cock, $m$, interposed therein, whereby, when said cock $m$ is closed, the diaphragm-chamber may be opened without interrupting the flow of gas through the valve-chamber.

In testimony that I claim the foregoing as my own I have hereto affixed my signature in presence of two witnesses.

JOHN F. MAXSON.

Witnesses:
S. B. THOMAS,
M. E. PALMITER.